United States Patent [19]

Baasch et al.

[11] 4,276,574
[45] Jun. 30, 1981

[54] READ/WRITE AND TUNNEL ERASE MAGNETIC HEAD ASSEMBLY

[75] Inventors: Holger J. Baasch, Rochester; Francis S. Luecke, Byron, both of Minn.

[73] Assignee: International Business Machines Corporation, Armonk, N.Y.

[21] Appl. No.: 101,027

[22] Filed: Dec. 6, 1979

[51] Int. Cl.³ .............................................. G11B 5/27
[52] U.S. Cl. ..................................... 360/121; 360/118
[58] Field of Search ................................ 360/121, 118

[56] References Cited

U.S. PATENT DOCUMENTS

| | | | |
|---|---|---|---|
| 3,485,958 | 12/1969 | Bos et al. ............................. | 360/118 |
| 3,810,244 | 5/1974 | Hasegawa ............................ | 360/118 |
| 3,827,083 | 7/1974 | Hosaka et al. ...................... | 360/121 |
| 3,846,840 | 11/1974 | Childers ............................... | 360/118 |
| 3,964,103 | 6/1976 | Thompson et al. .................. | 360/118 |
| 4,110,804 | 8/1978 | Castrodale et al. ................. | 360/118 |

OTHER PUBLICATIONS

Dawson, "Side Erase Magnetic Head", IBM Tech Disc Bull, vol. 8, No. 2, Jul. 1965, p. 220.

*Primary Examiner*—Robert S. Tupper
*Attorney, Agent, or Firm*—Keith T. Bleuer

[57] ABSTRACT

A magnetic head assembly for reading and/or writing a track of magnetic information on a moving magnetic medium and for erasing edge portions of the track. The head assembly comprises a central data transfer magnetic core including a pair of core portions providing a data transfer gap on an active face of the head assembly with a read/write coil on one of the core portions. The head assembly comprises also an erase core which includes a pair of erase core portions extending along and in contact with one of the write core portions, another pair of erase core portions respectively in alignment with the first named erase core portions and providing therewith erase gaps on the active face of the head assembly that extend transversely of the direction of movement of the magnetic medium on the active face and a core portion on which an erase coil is disposed bridging and between the last two mentioned erase core portions. The two erase gaps are in series with each other and with the remainder of the parts of the erase core so that the erase flux flows through the erase gaps in the direction of movement of the magnetic medium on the active face and flows transversely of this direction of movement from one of the gaps to the other gap.

8 Claims, 6 Drawing Figures

FIG. 5
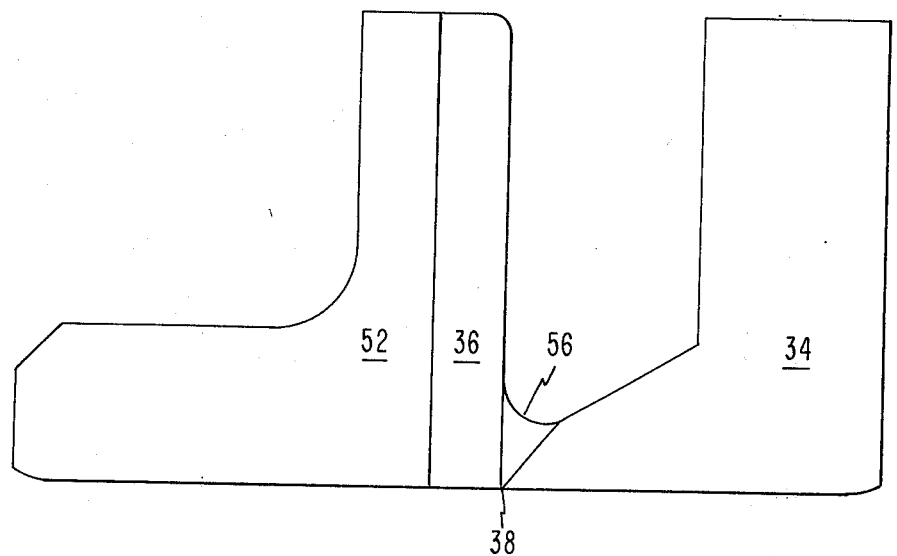
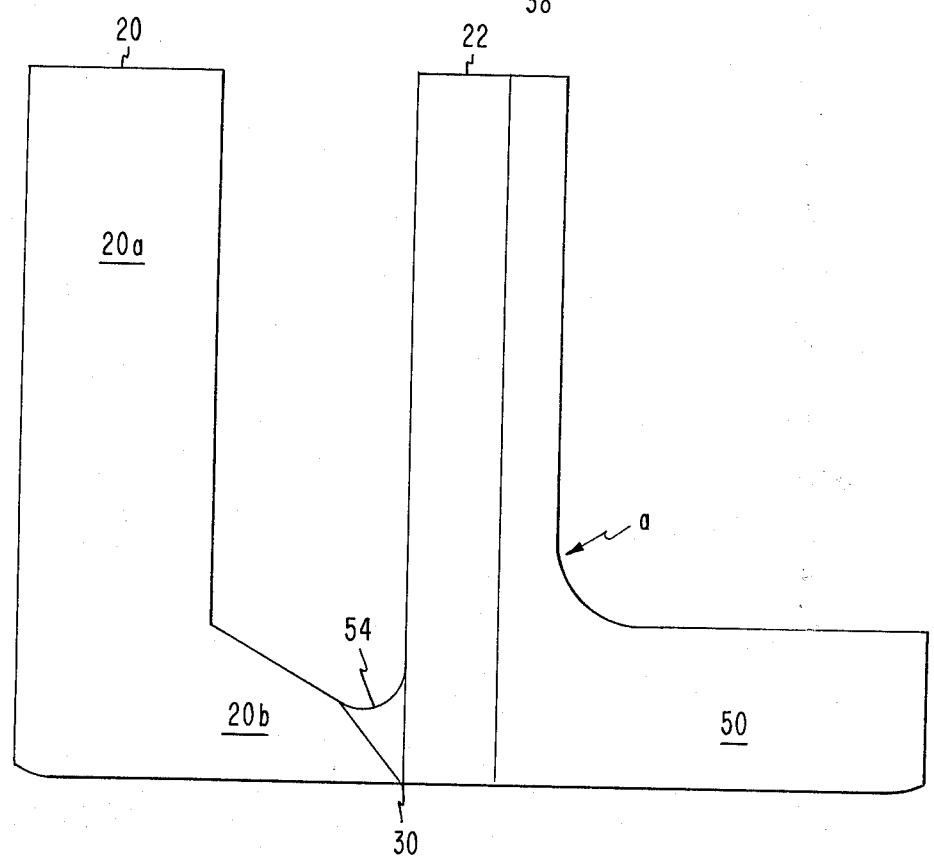
FIG. 6

READ/WRITE AND TUNNEL ERASE MAGNETIC HEAD ASSEMBLY

BACKGROUND OF THE INVENTION

The invention relates to magnetic heads, head assemblies or transducers and more particularly to such heads which provide a tunnel erasing action by means of erasing core portions having gaps therebetween on an active face of the head on opposite sides of a central read/write core having a read/write gap in said active face.

Magnetic heads of this general description have previously been suggested, such as in Castrodale et al U.S. Pat. No. 4,110,804. The magnetic head assembly disclosed in this patent includes a central read/write core having a read/write winding on one of the legs of the core and a pair of erase cores on the two sides of the read/write core. Erase gaps are provided in the two erase cores and are positioned quite close to a read/write gap in the read/write core longitudinally of the active face of the transducer on which the magnetic medium used in connection with the transducer travels so that the erase cores and the read/write core overlap to some extent. A single erase winding is disposed about the two erase cores and magnetically links the erase cores. Such a magnetic head functions very well under most circumstances; however, since portions of the erase cores and erase magnetic circuits overlap and run parallel to a portion of the read/write core and the read/write magnetic circuit, the DC induced flux in the erase cores causes a bias on the read/write magnetic circuit.

Such bias would be minimized by using a single erase core with two erase gaps in series therein and having a single energizing winding thereon, with the flux flowing in a single path through the two erase gaps and cross ways through a portion of the associated write core from one erase gap to the other. Such a construction is shown in Bos et al, U.S. Pat. No. 3,485,958 in which the erase core constitutes a U-shaped piece having a winding on its central leg, with the ends of the U-shaped piece forming the erase gaps in conjunction with a part of the read/write core on the active face of the transducer. The lengths of the erase gaps and the flux flowing through these gaps are transverse of the active transducer face and the direction of movement of the magnetic medium across the active face, and the erase gap lengths are thus of the same dimension as the widths of the edge magnetic track portions to be erased on the magnetic medium. Therefore, if the portions of a magnetic track to be erased have substantial width, the lengths of the erase gaps have this same substantial dimension; and very considerable power is needed in order to provide an effective erase flux in these erase gaps.

SUMMARY OF THE INVENTION

It is an object of the present invention to provide an improved read/write and tunnel erase magnetic head assembly having a single erase core in which two opposite tunnel erase gaps are disposed carrying erase flux transversely to write flux through a portion of the write core for minimizing the coupling between the erase core and write core but with the arrangement being such that the erase gaps are very short (in the direction of flux flow) while yet being effective to erase substantial side or marginal widths of a track written by the write gap of the magnetic head.

In a preferred form, the magnetic head assembly of the invention includes a central read-write core which is closed except for a read/write gap therein on the active face of the head assembly, a single erase core having portions disposed on opposite faces of a leg of the read/write core, two side portions of the erase core with the first named portions of the erase core forming erase gaps that extend substantially in the same direction as the read/write gap, with another erase core portion supporting the erase coil and extending between the pair of side core portions just mentioned.

BRIEF DESCRIPTION OF THE DRAWINGS

FIG. 5 is a side elevational view of one layer of magnetically permeable core and ceramic spacer of the head assembly and taken on line 5—5 of FIG. 4; and FIG. 6 is a side elevational view of another layer of magnetically permeable core and ceramic spacer and taken on line 6—6 of FIG. 4.

DESCRIPTION OF THE PREFERRED EMBODIMENT

Figure 1:
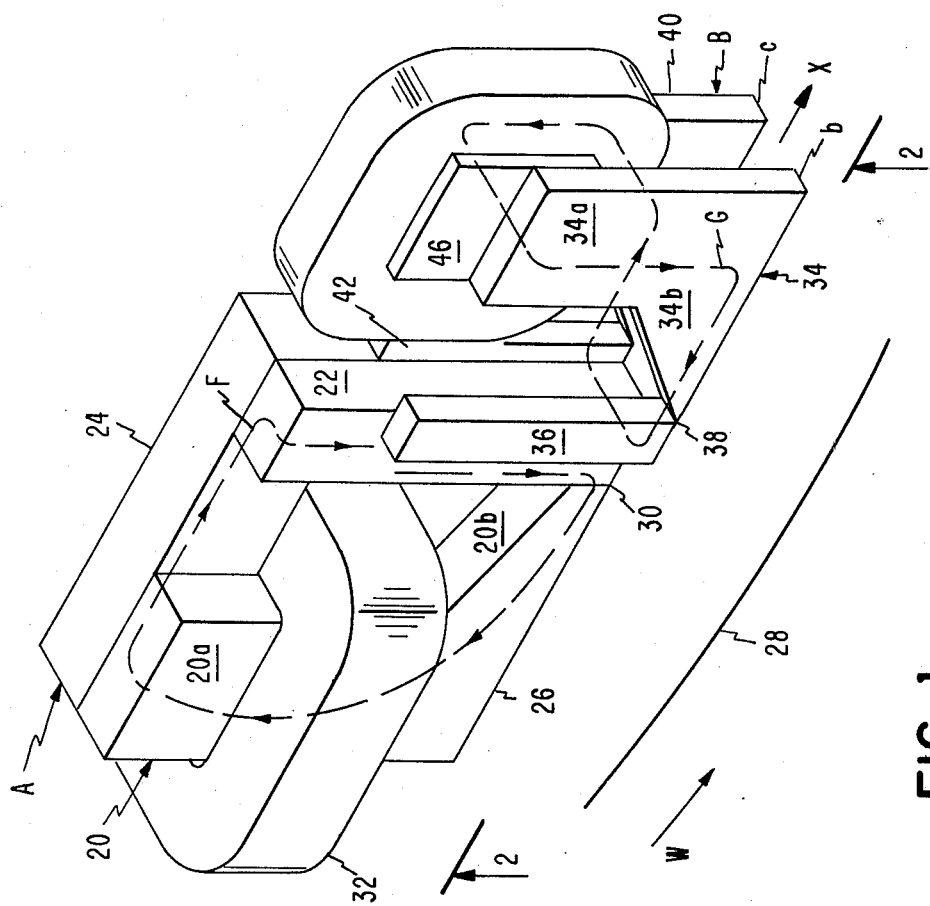
FIG. 1 is an isometric view of the magnetically permeable core portions and energizing coils of a magnetic head assembly embodying the principles of the invention.
Figure 2:
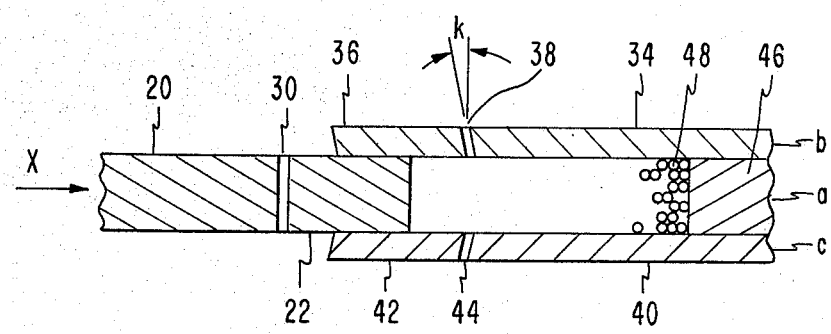
FIG. 2 is a fragmentary bottom plan view of the active face of the head assembly and taken on line 2—2 of FIG. 1.
Figure 3:
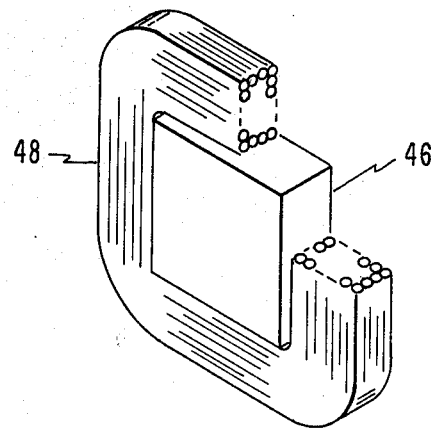
FIG. 3 is an isometric view of the erase coil of the head assembly together with the magnetically permeable core portion on which this coil is disposed.
Figure 4:
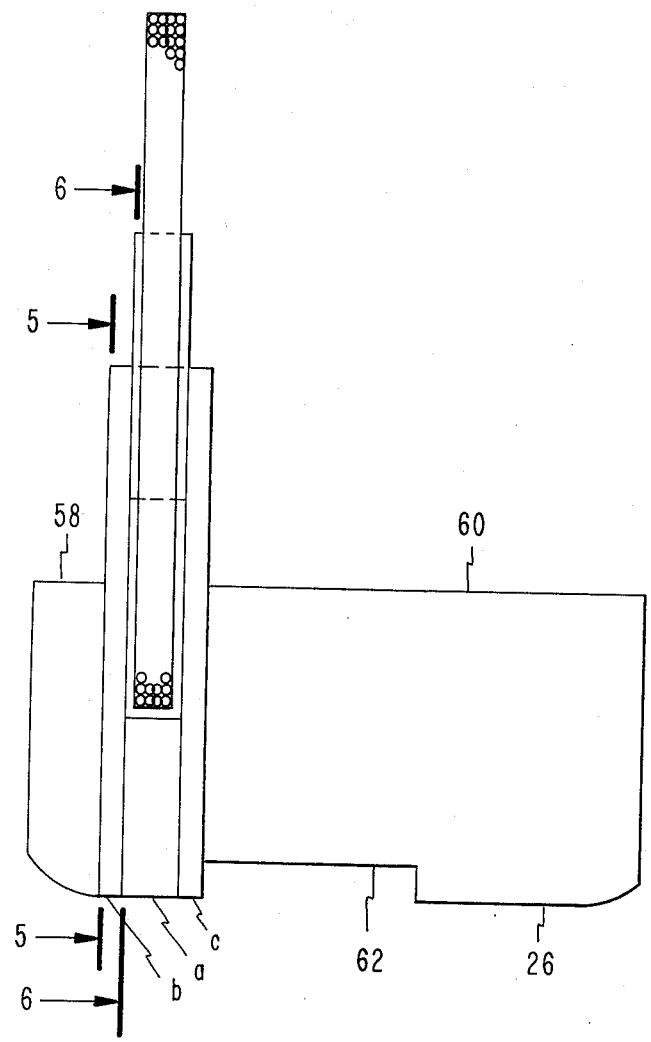
FIG. 4 is an end elevational view of the complete magnetic head assembly including the ceramic spacers which are used in conjunction with the magnetically permeable cores for completing the head assembly.

Referring to FIG. 1 in particular, the magnetic head assembly of the invention may be seen to comprise a read/write core A and an erase core B. The read/write core A comprises core portions 20 and 22 which are upstanding in the disposition of the head assembly shown in FIGS. 1, 4, 5 and 6 and are in a central layer a of the head assembly. The core portion 20 comprises an upper leg 20a and a tapered lower leg 20b, and the core A also includes a side bar 24 bridging and in contact with the core portions 20 and 22. The edge surfaces of the core portions 20 and 22 which are on the bottom in the disposition of the head assembly as it is shown in FIGS. 1, 4, 5 and 6 form a part of the elongate active face 26 of the head assembly, and the core portions 20 and 22 extend away from and normally to face 26. Elongate face 26 (and also layer a) extend in direction X, and face 26 is in contact or near contact with a magnetic medium such as the magnetic disk 28 rotating in rotative direction W and thus passing longitudinally along the face 26 in direction X. There is a gap 30 between the core portions 20 and 22 on the face 26, and this is the read/write gap of the head assembly; and it extends at right angles to the direction X as may be seen from FIG. 2. A read/write coil 32 is disposed on the leg 20a for sensing or producing a magnetic flux that flows in path F through the read/write core A and across the gap 30.

The erase core B includes the core portions 34 and 36 in an outer layer b which extends longitudinally of the head assembly in direction X. The core portion 34 has an upstanding leg 34a and a downwardly tapering leg 34b extending toward the core portion 36 and forming an erase gap 38 therewith on the active face 26 of the assembly. The gap 38 does not extend precisely transversely of the direction X but rather has a small angle k, which may be about 15 degrees, with respect to an exact transverse or perpendicular to direction X. The core portion 36 extends normally with respect to the face 26 and is in contact for its length with a face of the core portion 22. The shapes of the core portions 34 and 36 in elevation may be seen in FIG. 5.

The erase core B also includes core portions 40 and 42 which in elevation are substantially identical respectively with core portions 34 and 36, and FIG. 5 also therefore shows the shapes of the core portions 40 and 42. The core portions 40 and 42 are in an outer layer c extending in direction X, and they provide an erase gap 44 between them on the active face 26. The gap 44, like the gap 38, also extends at the same small angle with respect to a perpendicular to the direction X, and the gap 44 like the gap 38, flares outwardly and reversely of direction X from the central layer a (see FIG. 2). The core portion 42 for its length lies in contact with a face of the core portion 22 opposite that with which core portion 36 makes contact.

The erase core B also includes a core portion 46 bridging the core portions 34 and 40 and having its ends in contact or near contact with surfaces of the core portions 34 and 40. An erase coil 48 is wound about the core portion 46 and provides when energized magnetic flux extending in path G through the erase core 40. A part of the coil 48 lies between the core portions 34 and 40 as is clear from FIG. 1.

All of the core portions previously mentioned including portions 20, 22, 24, 34, 36, 40, 42 and 46 are of magnetically permeable material so as to allow the magnetic flux extending in paths F and G to exist respectively in the core A and core B. The head assembly also includes ceramic spacers for filling out the various layers a, b and c and which have bottom surfaces on the face 26. The middle layer a is completed by the L-shaped spacer 50 of ceramic material which lies in face to face relationship with the core portion 22 (see FIG. 6). The outer layer b is completed by an L-shaped spacer 52 of ceramic material which is in face to face relationship with the core portion 36. The outer layer c is identical with the outer layer b except that the end faces of the core portions 40 and 42 are cut oppositely with respect to the end faces of the core portions 34 and 36 so that the gap 44 extends at an angle that flares outwardly opposite to the angle k shown in FIG. 2.

All of the gaps 30, 38 and 44 are filled with a non-magnetic filler material. The fillers 54 and 56 for the gaps 30 and 38 are shown in FIGS. 6 and 5, and the filler for the gap 44 is similar. These fillers may be solidified molten glass, for example.

The assembly is completed by outriggers 58 and 60 of non-magnetic material. The outrigger 58 is relatively thin and is fixed to the layer b, while the outrigger 60 is relatively wide and is fixed to the layer c. The outriggers 58 and 60 complete the active face 26, and the outrigger 60 is provided with a groove 62 which is in the face 26 and is approximately centrally located, extending in the longitudinal direction X. All of the non-magnetic parts, including the parts 52, 50, 58 and 60, may specifically be made of baria titania ceramic, for example, as suggested in said U.S. Pat. No. 4,110,804.

In operation, the coil 32 is electrically energized with an alternating current and produces an alternating magnetic flux in path F extending from core portion 20, through side bar 24, core portion 22 and gap 30 back to core portion 20. The gap 30 extends exactly transversely to direction X, and this has the effect of writing data magnetically with transitions in the same direction as that of gap 30 on the surface of the disk 28 that is in moving contact or near contact with the active face 26.

A steady state direct current is supplied to the erase coil 48, and this produces a steady state magnetic flux that flows in path G through core portion 34, gap 38, core portion 36, core portion 22, core portion 42, gap 44 and core portion 40 and back to core portion 46. It is thus clear that all of the core portions in the erase core B are in series, and the single erase coil 48 is responsible for providing the magnetic flux in this series magnetic circuit. The same flux that flows through the erase gap 38 also flows through the erase gap 44, and the direction of flux flow through both gaps is longitudinally of the head assembly and elongate face 26 (in direction X or exactly opposite to direction X). The flux turns for 90° in core portions 36 and 42 to enter and leave core portion 22 and in passing through core portion 22 does so in a direction at 90° to path F. The magnetic flux passing across the gaps 38 and 44 thus has the effect of the trimming the boundaries or marginal edge portions of the data track previously written by the gap 30 as the disk 28 rotates in direction W so that the resultant track is of a predetermined restricted width. The flux across the gaps 38 and 44 can also be used to trim a previously written track on disk 28.

It is desirable that the erase gaps 38 and 44 be close to the gap 30 in the direction X (for efficiency in formatting the magnetic track), and this has been accomplished by mounting the core portions 36 and 42 in contact with the core portion 22. The core portions 36 and 42 for their complete lengths are in contact with the core portion 22 on opposite faces of the latter as shown. Any undue magnetic interaction and coupling between the erase core B and read/write A is however, avoided, since the flux that passes through the gap 38 and through the core portion 36 then passes through the core portion 22 to the core portion 42 in a direction at 90 degrees with respect to the read/write flux in path F passing longitudinal of core portion 22. Thus, DC flux bias from the erase core B on the read/write core A is reduced; and, if there are any current transients in the erase coil 48, as when turning current ON or OFF in this coil, the effect of these also is minimized on the read/write core A.

Since the erase gaps 38 and 44 extend essentially transversely with respect to the longitudinal direction X of the head assembly and in which the magnetic medium 28 moves on the elongate active face 26, these gaps may be relatively short in length (in the direction in which flux flows through the gaps, in direction X) while yet being effective to erase relatively wide widths on the edges of a previously recorded magnetic track on disk 28. The erase gaps 38 and 44 may have lengths (in the direction X), for example, from 0.0026 mm to 0.0043 mm and may have widths (perpendicular to direction X) of 0.165 mm. Thus, the erase gaps 38 and 44 which are relatively short in length (in direction X) and thus require a minimum amount of power nevertheless can erase a substantial width, such as 0.165 mm. In the same construction, the erase flux passes through the core portion 22 of the core A transversely thereto and transverse to the direction in which the flux in core A travels through the core portion 22 for reducing magnetic coupling as above mentioned, and this is accomplished essentially by turning the flux through 90 degrees from and to the erase gaps 38 and 44 in the erase core portions 36 and 42 for this purpose. Incidentally, the read/write gap 30 may for example have a length (in the direction X) from 0.00152 mm to 0.00342 mm, and its width (transverse to direction X) may be 0.33 mm. The read/write gap thus has a shorter length (in direction X) for better recording while having a considerably wider width (transverse to direction X).

For a reading action by the head assembly of a previously written magnetic track on the disk 28, the gap 30 and coil 32 are operative for this purpose as disk 28 moves in direction W. The erase gaps 38 and 44 are preferably slanted with respect to a transverse or perpendicular to the direction X particularly for a reading action by the head assembly. The slant is shown by the angle k (FIG. 2), and the angle k can well vary from 0 degrees to 20 degrees. The gaps 38 and 44 are preferably slanted with respect to a transverse to the direction X so that the erase core B does not pick up signal from a previously written track that is being read by the core A, assuming that the track shifts slightly transversely of the direction X (at some time before the reading action). Since the gap 30 extends transversely with respect to the direction X, the transitions in the track extend in this direction also; and setting the gaps 38 and 44 to extend at an angle with respect to these transitions causes a lack of coupling of the transitions to the edges of the core B forming the gaps 38 and 44. It is desirable, however, that the gaps 38 and 44 extend essentially transversely with respect to the direction X so that the gaps 38 may be short in length (in direction X) and so that a minimum of power is required to provide the necessary erase flux across the gaps 38 and 44, using the coil 48.

Other changes, in addition to changes to the dimensions of the gaps 30, 38 and 44 and the slant of gaps 38 and 44 may be made to the magnetic head structure 40 above described and depicted in the attached drawings, all within the scope of the invention. For example, the core portion 46 could be made round instead of square; and, with this alteration, the coil 48 in elevation would be round to correspond with the round core portion.

Having thus described our invention, what we claim as new, and desire to secure by Letters Patent is:

1. A magnetic head assembly having an elongate active face and including:
    a pair of magnetically permeable data transfer core portions having faces forming parts of said active face and providing a data transfer gap between them extending transversely across said active face,
    a data transfer coil on one of said core portions,
    a pair of magnetically permeable erase core portions having faces that form parts of said active face and extending along and in contact with the opposite sides of one of said data transfer core portions,
    a second pair of magnetically permeable erase core portion having faces that form parts of said active face, each of said second pair of erase core portions extending in the direction of said elongate active face from and in alignment with one of said first named pair of erase core portions and providing an erase gap which is between it and the respective one of said first named erase core portions and which extends essentially transversely across said active face,
    a bridging core portion of magnetically permeable material disposed between and magnetically connecting said second pair of erase core portions, and
    an erase coil disposed on said bridging core portion.

2. A magnetic head assembly as set forth in claim 1, said erase gaps each extending at a small angle with respect to the transverse direction on said active face.

3. A magnetic head assembly for transferring data and for erasing edge portions of recorded data comprising:
    a center data transfer layer and a pair of outer erase layers on opposite sides of the center layer all extending longitudinally of the head assembly and providing with edge surfaces thereof an active face of the head assembly extending longitudinally thereof,
    said center layer including a data transfer core of magnetically permeable material which includes first and second data transfer core portions providing a data transfer gap between them which is on said active face and extends transversely thereof,
    each of said outer layers including a first erase core portion of magnetically permeable material in contact with said second data transfer core portion and a second erase core portion of magnetically permeable material providing an erase gap which is on said active face and extends essentially transversely thereof, and a bridging core portion extending between said second erase core portions and providing a series magnetic circuit from the bridging core portion through the second erase core portion in one of said outer layers, said erase gap in this layer, said first erase core portion in this layer, said second data transfer core portion, said first erase core portion in the other of said outer layers, the erase gap in the latter outer layer and the second core portion in the latter outer layer back to said bridging core portion,
    an erase coil disposed on said bridging core portion, and a data transfer coil disposed on said data transfer core.

4. A magnetic head assembly as set forth in claim 3, said erase gaps each extending at a small angle with respect to the transverse direction on said active face.

5. A magnetic head assembly as set forth in claim 3, said second data transfer core portion and said first erase core portions extending in directions away from and normal to said active face and being in contact for the lengths of said first erase core portions.

6. A magnetic head assembly as set forth in claim 3, said data transfer coil being disposed on said first data transfer core portion.

7. A magnetic head assembly as set forth in claim 3, said data transfer coil being disposed on said first data transfer core portion and said data transfer core including a side bar in contact with said first and second data transfer core portions and completing said data transfer core.

8. A magnetic head assembly as set forth in claim 3, said center layer being completed by a portion of non-magnetic material extending between said second erase core portions of said outer layers and having an edge surface on said active face of the head assembly, said outer layers being completed by portions of non-magnetic material extending along said first and second data transfer core portions and having edge surfaces on said active face of the head assembly.

* * * * *